United States Patent

[11] 3,610,728

| [72] | Inventor | Ronald R. Firth |
| | | Rochester, N.Y. |
| [21] | Appl. No. | 813,936 |
| [22] | Filed | Apr. 7, 1969 |
| [45] | Patented | Oct. 5, 1971 |
| [73] | Assignee | Eastman Kodak Company |
| | | Rochester, N.Y. |

[54] SCREEN ORBITING MECHANISM
9 Claims, 10 Drawing Figs.

[52] U.S. Cl. ................................................. 350/120
[51] Int. Cl. ............................................... G03b 21/56
[50] Field of Search ..................................... 350/120, 123, 117

[56] References Cited
UNITED STATES PATENTS

| 2,326,042 | 8/1943 | Lessman | 350/117 UX |
| 2,525,596 | 10/1950 | Finn | 350/120 |
| 2,780,136 | 2/1957 | Erban | 350/120 |
| 2,837,008 | 6/1958 | Erban | 350/120 |
| 3,125,927 | 3/1964 | Erban | 350/120 |
| 3,186,299 | 6/1965 | Parenti | 350/120 |
| 3,473,862 | 10/1969 | Hauber et al. | 350/120 |
| 2,689,387 | 9/1954 | Carr | 350/117 UX |

FOREIGN PATENTS

| 592,815 | 9/1947 | Great Britain | 350/120 |

*Primary Examiner*—Louis R. Prince
*Assistant Examiner*—Joseph W. Roskos
*Attorneys*—William H. J. Kline, Robert F. Crocker and Lloyd F. Seebach

ABSTRACT: A device for orbiting a rear projection screen in which the combination of the screen and the orbiting mechanism eliminates substantially all screen scintillations. The screen comprises a fixed and a movable plate and the device comprises an arrangement of moment arms that are pivotally mounted for movement by an eccentric. The arms are arranged 90° out of phase and each arm is located relative to a respective adjacent side of the screen. Each of the arms contacts a respective side of the movable plate of the screen by means of a flexible driving wire so that the movable plate is moved in an orbital path relative to the fixed plate.

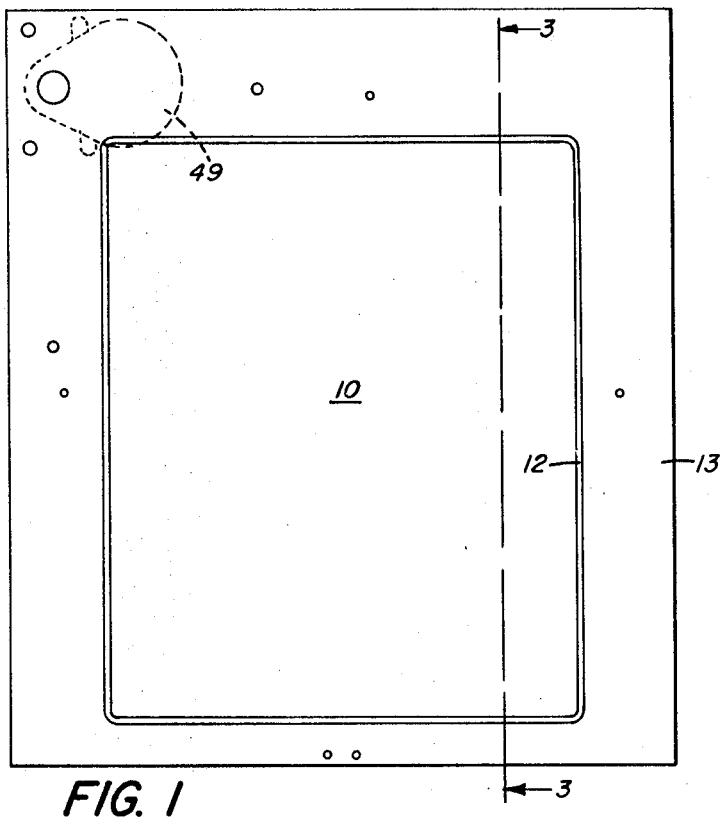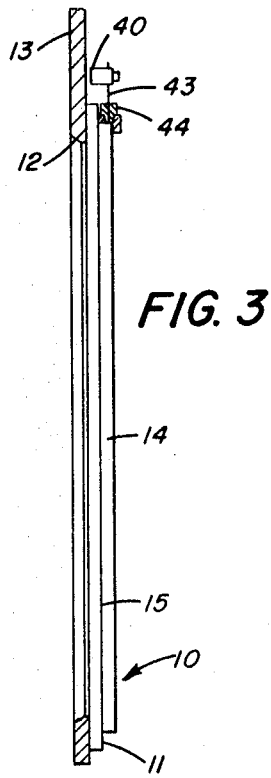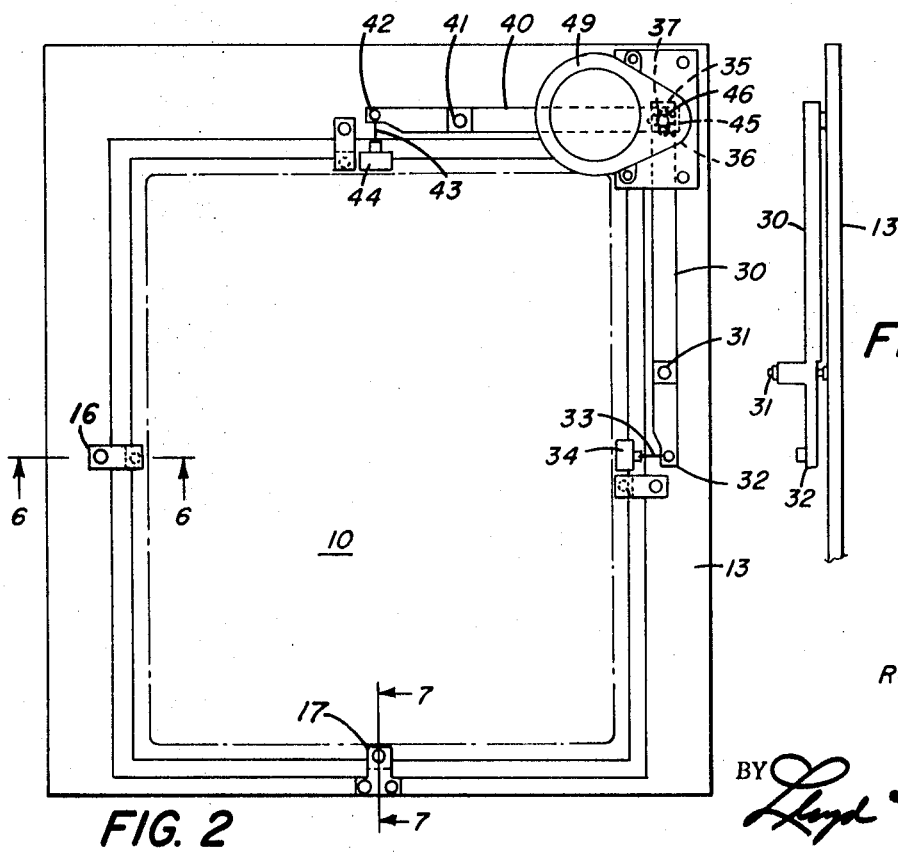

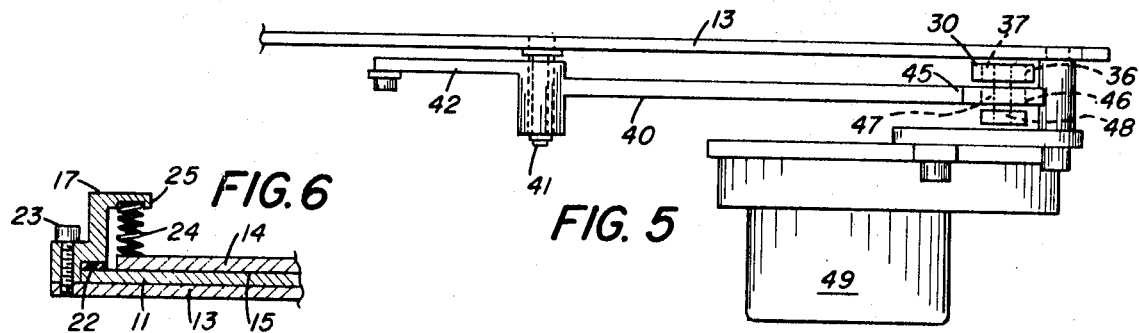
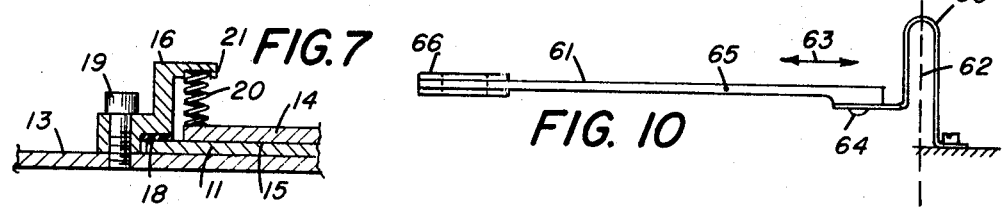
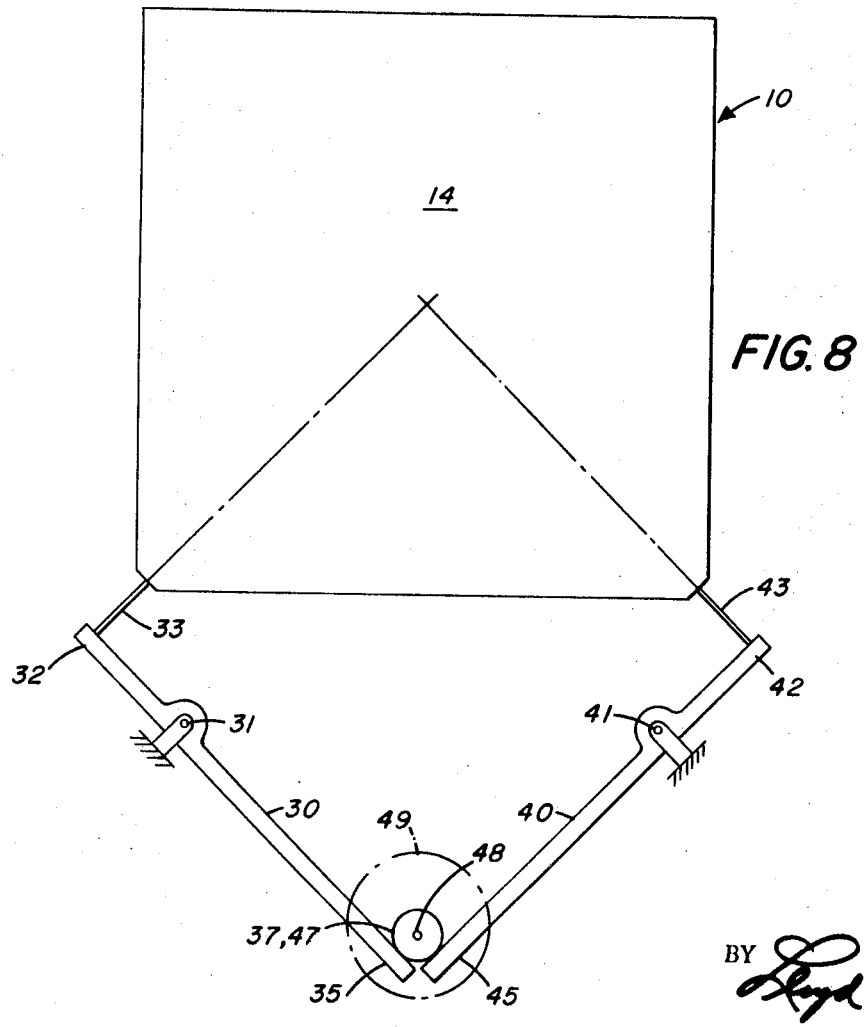

PATENTED OCT 5 1971

RONALD R. FIRTH
INVENTOR.

BY Lloyd F. Auerbach

AGENT

SCREEN ORBITING MECHANISM

1. Field of the Invention

The invention relates to a projection screen and more particularly to a rear projection screen comprising a fixed and movable plate and a mechanism for moving only the movable plate in an orbital path for eliminating screen scintillations.

2. Description of the Prior Art

The scintillations produced on a screen by a light image transmitted through the screen have always been a source of unwanted illumination that appears on the viewing side of a screen. Various attempts have been made to eliminate scintillations by modifying the surfaces of the screen, by coating the screen with various types of diffusing materials, by moving the screen in various paths of movement, or by a combination of such screen treatments and screen movements. In many attempts to eliminate scintillations, the screen is moved in either a vertical or a horizontal direction but such movement does not eliminate the scintillations because they reappear when the velocity of the screen is zero or when the direction of screen movement is reversed. In other instances, the screen is moved in an orbital path, but the screen comprises a single member so that the scintillations are not completely eliminated and may be prevalent in the areas of the screen adjacent the edges. At the present time there is no combination of screen structure and orbiting mechanism that is known to completely eliminate screen scintillations.

SUMMARY OF THE INVENTION

The primary object of the invention is to provide a simple mechanical means for moving one element of a screen in an orbital path.

Another object of the invention is to provide a simple mechanism by which one element of a transmission screen can be moved relative to another element of the same screen and in which the orbital path is such that screen scintillations are eliminated.

Yet another object of the invention is to provide a simple orbiting device for a rear projection screen that can be used interchangeably in film readers and printers.

These and other objects of the invention will be apparent to those skilled in the art by the following description of the preferred embodiments of the invention.

The objects of the invention are attained by a device comprising a pair of moment arms, each of which has one end in pivotal engagement with a motor-driven eccentric. The arms are arranged relative to the eccentric so that they are 90° out of phase and extend along adjacent sides of the screen. The other end of each arm carries a spring wire or a flat spring which has its free end in engagement with an edge of the movable plate of a two-plate screen. As the eccentric rotates, the free end of each respective arm moves the movable screen plate in an orbit, preferably circular, so that any screen scintillations are eliminated. The screen per se comprises two, spaced glass plates having their facing surfaces coated with a light transmitting and diffusing material and maintained in spaced relation by a transparent resilient material. Such a screen is disclosed and described in detail in U.S. Pat. application Ser. No. 814,006, filed Apr. 7, 1969, in the name of Robert N. Wolfe.

DESCRIPTION OF THE DRAWINGS

Reference is now made to the accompanying drawings wherein like reference numerals designate like parts and wherein:

FIG. 1 is a front elevational view of a screen and an orbiting mechanism for the screen in accordance with the invention;

FIG. 2 is a rear view of the screen arrangement shown in FIG. 1;

FIG. 3 is a vertical section along line 3—3 in FIG. 1 and showing the arrangement by which the movable member of the screen is interconnected to the orbiting device;

FIG. 4 is a partial side elevational view of one of the moment arms shown in FIG. 2;

FIG. 5 is a partial plan view of the motor drive and its interconnection with one of the moment arms shown in FIG. 2;

FIGS. 6 and 7 are sectional views taken, respectively, on the lines 6—6 and 7—7 in FIG. 2;

FIG. 8 is a diagrammatic representation of another embodiment of the orbiting mechanism in which the screen is engaged at the corners thereof;

FIG. 10 is a detail plan view of a moment arm showing another arrangement for pivotally mounting such arm by means of a flexure member.

DESCRIPTION OF THE PREFERRED EMBODIMENTS

Figure 9:
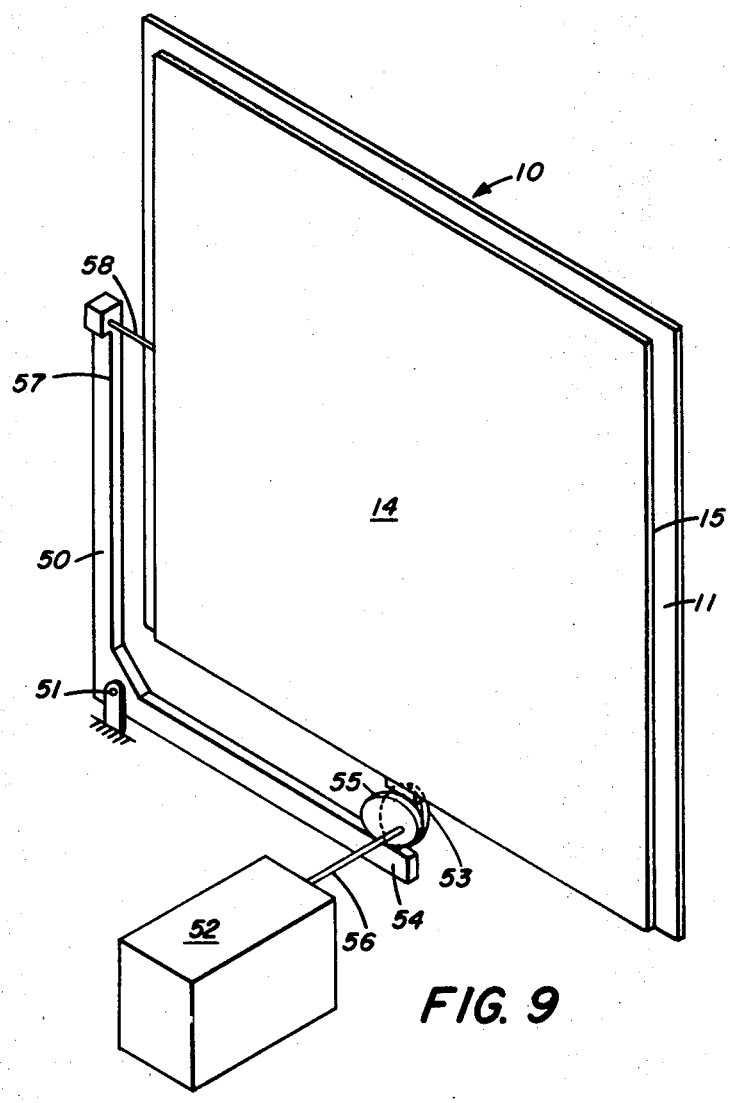
FIG. 9 is a perspective view of still another embodiment of the orbiting mechanism.

Before describing the orbiting device for the screen a short description of the screen referred to in the above-mentioned U.S. Pat. application will be presented. A screen 10 comprises a transparent plate 11 which is fixed in position relative to the aperture 12 in a front plate 13 of a film reader or similar apparatus in which a rear projection screen might be used. The movable plate 14 of screen 10 is maintained in spaced relation to plate 11 by a layer of transparent resilient material 15. This material permits movement of plate 14 relative to plate 11 and the resilient structure of the material is such that no returning force is necessary to maintain the plates in a neutral (free of any stress) position. It might also be pointed out that the plates 11 and 14 are provided on their facing surfaces with a layer of light-diffusing material as described in the above-mentioned patent application.

With reference to FIGS. 6 and 7 the plate 11 is maintained in position on plate 13 by brackets 16 and 17 which are arranged relative to the screen 10 as shown in FIGS. 6 and 7. The bracket 16 is separated from plate 11 by a rubber pad 18 and maintained in position by means of screws 19. A spring 20 is arranged between the outer surface of plate 14 and the overhanging portion 21 of bracket 16. The spring 20 exerts a very light force on plate 14 and is not sufficient to interfere with the movement of plate 14 relative to plate 11 by the mechanism to be described hereinafter. Likewise, the bracket 17 is separated from plate 11 by a rubber pad 22 and maintained against plate 13 by means of screws 23. A spring 24 engages the outer surface of plate 14 and is retained in position by the overhanging portion 25 of bracket 17. It will be noted from FIG. 2 that the brackets 16 are arranged with respect to one set of opposite sides (long dimension) of screen 10, whereas brackets 17 are arranged with respect to the other set of opposite sides (short dimension) of the screen 10.

With reference to FIG. 2, an arm 30 is arranged at one side of screen 10 and pivotally mounted on plate 13 at 31. The end 32 of arm 30 carries a flexible wire 33 which engages a member 34 secured to the edge of plate 14. The other end 35 of arm 30 is provided with a longitudinal slot 36 which engages an eccentric 37. Likewise, an arm 40 is arranged relative to an adjacent side of screen 10 and is pivotally connected to plate 13 at 41. The end 42 of arm 40 carries a flexible wire 43 which engages a member 44 secured to the edge of plate 14. The end 45 of arm 40 is provided with a slot 46 which also engages the eccentric 37. The eccentric 37 is formed on the end of a shaft 48 which is on the output side of a motor 49. The eccentric 37 is arranged on shaft 48 such that the movement imparted with respect to each of arms 30 and 40 is 90° out of phase.

The eccentric 37 has to move the arms 30 and 40 only a very small amount in order to provide the necessary movement of the plate 14 to eliminate the screen scintillations. It has been found that the movement of the plate 14 relative to plate 11 does not have to be more than 0.0075 inch in diameter at a speed of about 220 r.p.m. to remove all the scintillations. The distance through which the path extends is not critical nor is the orbits in a speed so long as the movable plate moves at a sufficient speed so that the resulting variation in the scintillation pattern is above the critical flicker frequency of the human eye; namely, approximately 60 cycles/second. The wires 33 and 43 can be attached to their respective arms by silver solder, swedging or any other manner, but preferably so they can be adjusted within the limitations required in accordance with the screen size. The driving wires 33 and 43 should preferably be small enough that they retain their flexibility without buckling under the driving load. The diameter of such a driving wire will be dependent upon the screen size and the method of connecting the ends of the wire to the arms. The members 34 and 44 can be cemented to the plate 14 and provided with an indent for receiving the driving end of the respective wires 33 and 43. It is not always essential that the members 34 and 44 be fixed to plate 14 in a secure manner because there can be a positive pressure exerted on the drive wires by plate 14.

As arms 30 and 40 force the driving wires 33 and 43 against the members 34 and 44, the transparent resilient material 15 between plates 11 and 14 has sufficient shear force to force the plate 14 to return to its original position. Consequently, no force other than that which is already existing in the screen itself is required to return the plate 14 to its normal position relative to plate 11. It is preferred that each of wires 33 and 43 be flexed equally to each side of their unstressed or normal position because this minimizes the lateral flexing wire force which, when in excess, causes the transparent resilient material to be stressed torsionally, thereby producing an unwanted rotational component of motion. While the wires 33 and 43 are shown as cylindrical wires, thereby permitting flexing of the axes thereof in any direction, a flat spring member can also be used in some applications even though such a member would be limited to its directions of flexure. It is also preferred that the members 34 and 44 be located along orthogonal lines that intersect at the shear center of the screen. When this condition exists, the plate 14 will move in pure translation in the respective directions of motion. The shear center is the point on plate 14 or on screen 10 through which an externally applied force will cause pure translation in the direction of the force. Although these conditions provide an optimum result, any small departures from these conditions do not result in an unsatisfactory operation of the screen.

With reference to FIG. 8 an arrangement for orbiting the screen 10 is shown in which a maximum space might be available at only one side of the screen. In this case the arrangement of arms can have a geometry as shown in FIG. 8. The numerals generally correspond to those denoting the same parts as described with respect to FIG. 1.

While the eccentric 37 has been described above as engaging and actuating respective arms 30 and 40, a double eccentric can be used in which the same arrangement of arms would be used. In FIG. 9, a single arm 50 is used which is pivotally mounted at 51. A motor 52 drives an eccentric 53 which engages an edge of the plate 14, and it will be noted that the free end 54 of arm 50 engages a second eccentric 55 which can be formed integral with eccentric 53 on a shaft 56. The other free end 57 of arm 50 carries a driving wire 58 which also engages an edge of plate 14. Even though the plate 14 is driven directly from eccentric 53 at one side, the movement of the ends 54 and 57 of arm 50 are 180° out of phase. The magnitude of the eccentricity in each case may or may not be dependent on the magnification of the eccentric motion by arm 50. The objective is to obtain nearly equal displacement amplitudes in the two directions of motion so that generally circular motion of plate 14 takes place.

With reference to FIG. 10 a flexure spring 60 provides a simple way of obtaining a pivot that is substantially free of lost motion. Such a structure has two modes of defection which occur simultaneously; one is torsion which allows arm 61 to rotate about the pivot axis defined by the dotted line 62 and the other is bending which allows the arm to move in a transverse direction as indicated by arrow 63. It should be noted that transverse component of motion in one movement arm results in a rotational component of motion in the other arm. The flexure spring 60 can be a separate member secured to arm 61 as at 64 or can be formed integral with the end of the arm. As in the structure shown in FIG. 2, the arm 61 is provided with a driving wire 65 and has a portion 66 provided with an opening or bearing for engaging an eccentric. It will be noted that the driving wire 65 is arranged between the pivotal end of arm 61 and the drive portion and this causes the transverse motion of the arm and the component of motion of the screen caused by the other arm to be in the same direction. Further, this position of the pivot, that is, the position of the flexure spring 60 reduces the transverse flexure of the driving wire and the minimum driving torque remains unaffected.

The invention has been described in detail with particular reference to preferred embodiments thereof, but it will be understood that variations and modifications can be effected within the spirit and scope of the invention.

I claim:

1. A device for orbiting one transparent member of a rear projection screen relative to another and fixed transparent member that is maintained in spaced relation to said one transparent member and joined thereto by a layer of transparent, resilient material to generally eliminate the scintillations produced by a light image incident on said screen, comprising:
   pivotal actuating means comprising a first arm and a second arm, each of which is pivotally mounted intermediate its ends along an adjacent side of said screen and has one end engaging said one transparent member at a peripheral point for applying a force directed toward a shear center of said one transparent member, the other ends of said arms being aligned with each other; and
   means for engaging the other ends of said arms and for moving the latter, whereby the force applied by said first arm to one of said points coacts with the force applied by said second arm at the other of said points to move said one transparent member in an orbital path.

2. The device in accordance with claim 1 wherein said first and second arms are arranged generally perpendicular to each other and said one end of each of said arms includes a generally flexible member for engaging said one transparent member.

3. The device in accordance with claim 1 wherein said means for engaging and moving said actuating means comprises a motor-driven eccentric engaging the aligned other end of said first and second arms, respectively, whereby the one end of said first and second arms coact to move said one transparent member in a generally circular path.

4. The device in accordance with claim 1 wherein said resilient material serves to counteract the actuating means applied to said one transparent member by said first and second arms.

5. The device in accordance with claim 1 wherein each of said one ends includes a driving wire for engaging said one transparent member, said driving wire being in a neutral engaging position when said resilient material is free of any rotational force.

6. The device in accordance with claim 1 wherein said means for engaging and moving said actuating means comprises drive means including an eccentrically mounted member for engaging a longitudinal slot in the other end of each of said arms, said slots being arranged perpendicular to each other, whereby the movement of said first arm relative to said second arm is 90° out of phase.

7. The device in accordance with claim 1 wherein said pivotal means comprises a pair of arms arrange at substantially right angles to each other, each of said arms being pivotally mounted intermediate its ends and one end of each arm being arranged relative to the other to form a common actuating point.

8. The device in accordance with claim 1 wherein said pivotal means comprises a first arm and a second arm each of which is flexure mounted at one end and carries a member intermediate its ends for engaging said one transparent member at one of said points, the other end of said first and second arms being aligned with each other for simultaneous and out of phase actuation by said engaging and moving means.

9. The device in accordance with claim 1 wherein each of said one end of said first and second arms engages an adjacent corner of said one transparent member.